United States Patent
Yang et al.

(10) Patent No.: US 8,886,241 B2
(45) Date of Patent: Nov. 11, 2014

(54) GSM BASE STATION IDENTITY CODE (BSIC) METHOD FOR IRAT CELL RESELECTION TO CONSERVE UE BATTERY POWER

(71) Applicant: QUALCOMM Incorporated, San Diego, CA (US)

(72) Inventors: Ming Yang, San Diego, CA (US); Tom Chin, San Diego, CA (US); Guangming Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/782,750

(22) Filed: Mar. 1, 2013

(65) Prior Publication Data
US 2014/0248876 A1 Sep. 4, 2014

(51) Int. Cl.
*H04B 7/00* (2006.01)
*H04W 36/00* (2009.01)

(52) U.S. Cl.
CPC ................................ *H04W 36/0061* (2013.01)
USPC ........ 455/513; 455/434; 455/435.3; 455/574; 370/311; 370/331; 370/352

(58) Field of Classification Search
CPC ....... H04W 28/24; H04W 4/00; H04W 36/30; H04M 1/27
USPC ................ 455/115.3, 134, 135, 150.1, 161.1, 455/161.3, 226.2, 432.1–444, 572–574, 455/512–513; 370/331–338, 311, 352–356
See application file for complete search history.

(56) References Cited

U.S. PATENT DOCUMENTS

| | | | | |
|---|---|---|---|---|
| 5,799,256 A | * | 8/1998 | Pombo et al. | 455/574 |
| 6,185,423 B1 | * | 2/2001 | Brown et al. | 455/434 |
| 7,535,846 B2 | | 5/2009 | Kim et al. | |
| 7,577,113 B2 | * | 8/2009 | Alon et al. | 370/311 |
| 7,649,862 B2 | * | 1/2010 | Guio et al. | 370/329 |
| 7,761,122 B2 | * | 7/2010 | HomChaudhuri | 455/574 |
| 7,876,729 B1 | * | 1/2011 | Grilli et al. | 370/332 |
| 8,090,395 B2 | * | 1/2012 | Ngai et al. | 455/513 |

(Continued)

FOREIGN PATENT DOCUMENTS

| | | |
|---|---|---|
| EP | 1954077 A1 | 8/2008 |
| GB | 2493290 A | 1/2013 |
| WO | 2006071178 A1 | 7/2006 |

OTHER PUBLICATIONS

"3rd Generation Partnership Project; Technical Specification Group Radio Access Network; Evolved Universal Terrestrial Radio Access (E-UTRA); Requirements for support of radio resource management (Release 11)" 3GPP Standard; 3GPP TS 36.133,3RD Generation Partnership Project (3GPP), Mobile Competence Centre ; 650, Route Des Lucioles . F-06921 Sophia-Antipolis Cedex ; France, vol. RAN WG4, No. V11.3.1, Jan. 17, 2013, pp. 1-648, XP050691740.

(Continued)

*Primary Examiner* — Sharad Rampuria
(74) *Attorney, Agent, or Firm* — Seyfarth Shaw LLP

(57) ABSTRACT

A measurement reporting method reduces battery waste. A UE receives a list of GSM neighbor cells and measures the signal strength of each of the GSM cells in the list. The UE performs base station identity code (BSIC) confirm/reconfirm procedures only for the cells having a signal strength above a threshold.

18 Claims, 6 Drawing Sheets

(56) References Cited

U.S. PATENT DOCUMENTS

| | | | |
|---|---|---|---|
| 8,121,622 B2* | 2/2012 | Han et al. | 455/456.5 |
| 8,200,221 B2* | 6/2012 | Tolli et al. | 455/435.3 |
| 8,355,757 B2* | 1/2013 | Rofougaran et al. | 455/574 |
| 8,442,248 B2* | 5/2013 | Solum | 381/315 |
| 8,718,017 B2* | 5/2014 | Chin et al. | 370/331 |
| 2009/0022062 A1 | 1/2009 | Wang et al. | |
| 2010/0035610 A1* | 2/2010 | Narang et al. | 455/434 |
| 2010/0330943 A1* | 12/2010 | Hoepfner | 455/226.2 |
| 2012/0014332 A1* | 1/2012 | Smith et al. | 370/329 |

OTHER PUBLICATIONS

International Search Report and Written Opinion—PCT/US2014/018803—ISA/EPO—Jul. 15, 2014.

* cited by examiner

GSM BASE STATION IDENTITY CODE (BSIC) METHOD FOR IRAT CELL RESELECTION TO CONSERVE UE BATTERY POWER

BACKGROUND

1. Field

Aspects of the present disclosure relate generally to wireless communication systems, and more particularly, to conserving UE battery power.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

In one aspect, a method of wireless communication is disclosed. The method includes receiving a list of global system for mobiles (GSM) neighbor cells for cell reselection. A signal strength is measured for each of the GSM cells in the list. A base station identity code (BSIC) confirm/reconfirm procedure(s) is performed only for cells having signal strength above a threshold.

Another aspect discloses an apparatus including means for receiving a list of global system for mobiles (GSM) neighbor cells for cell reselection. Also included is a means for measuring signal strength of each of the GSM cells in the list. A means for performing base station identity code (BSIC) confirm/reconfirm procedure(s) only for cells having signal strength above a threshold is also included.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of receiving a list of global system for mobiles (GSM) neighbor cells for cell reselection. The program code also causes the processor(s) to measure signal strength of each of the GSM cells in the list. The program code also causes the processor(s) to perform base station identity code (BSIC) confirm/reconfirm procedure(s) only for cells having signal strength above a threshold.

Another aspect discloses wireless communication having a memory and at least one processor coupled to the memory. The processor(s) is configured to receive a list of global system for mobiles (GSM) neighbor cells for cell reselection. The processor(s) is also configured to) to measure signal strength of each of the GSM cells in the list. The processor(s) is further configured to perform base station identity code (BSIC) confirm/reconfirm procedure(s) only for cells having signal strength above a threshold.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
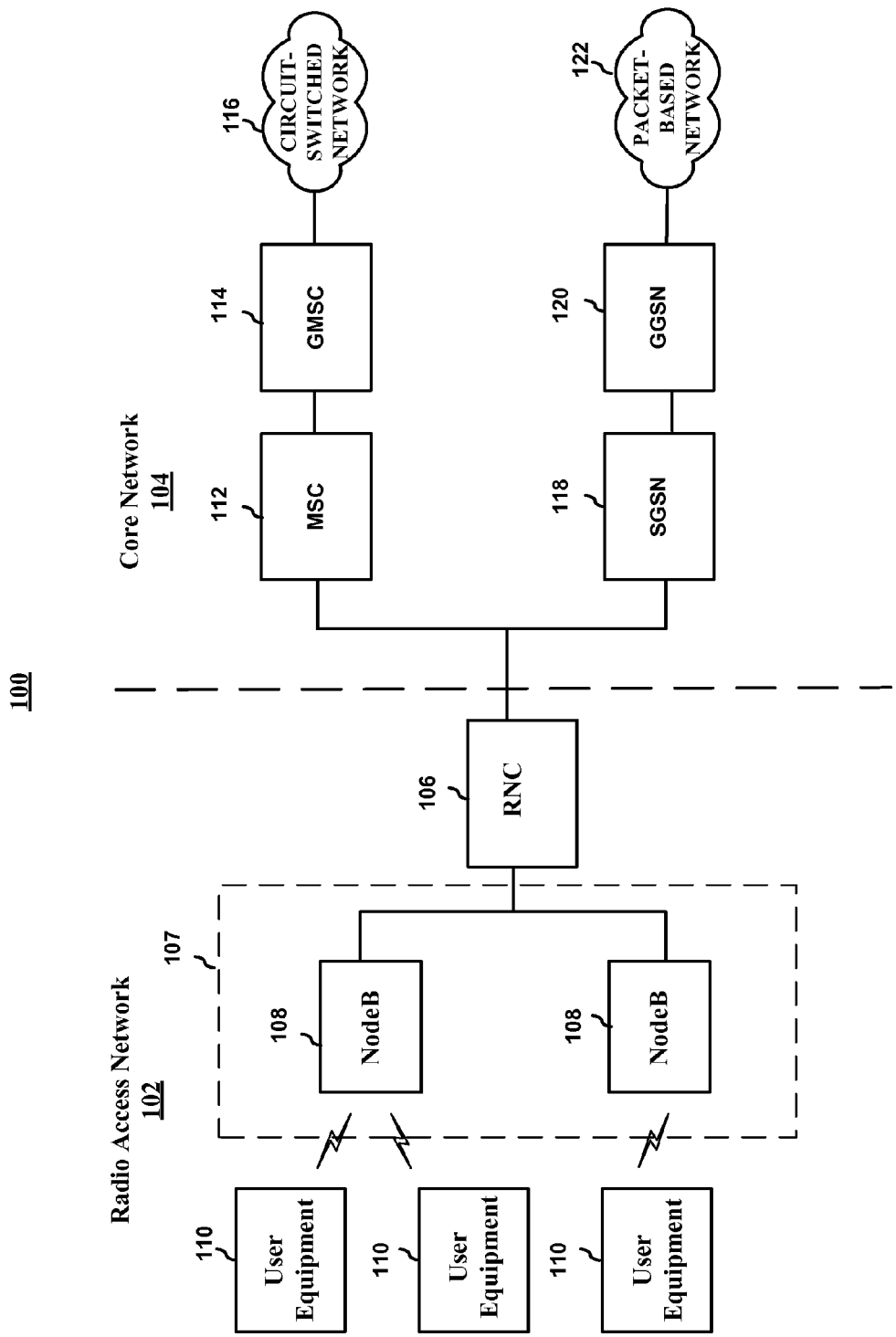
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
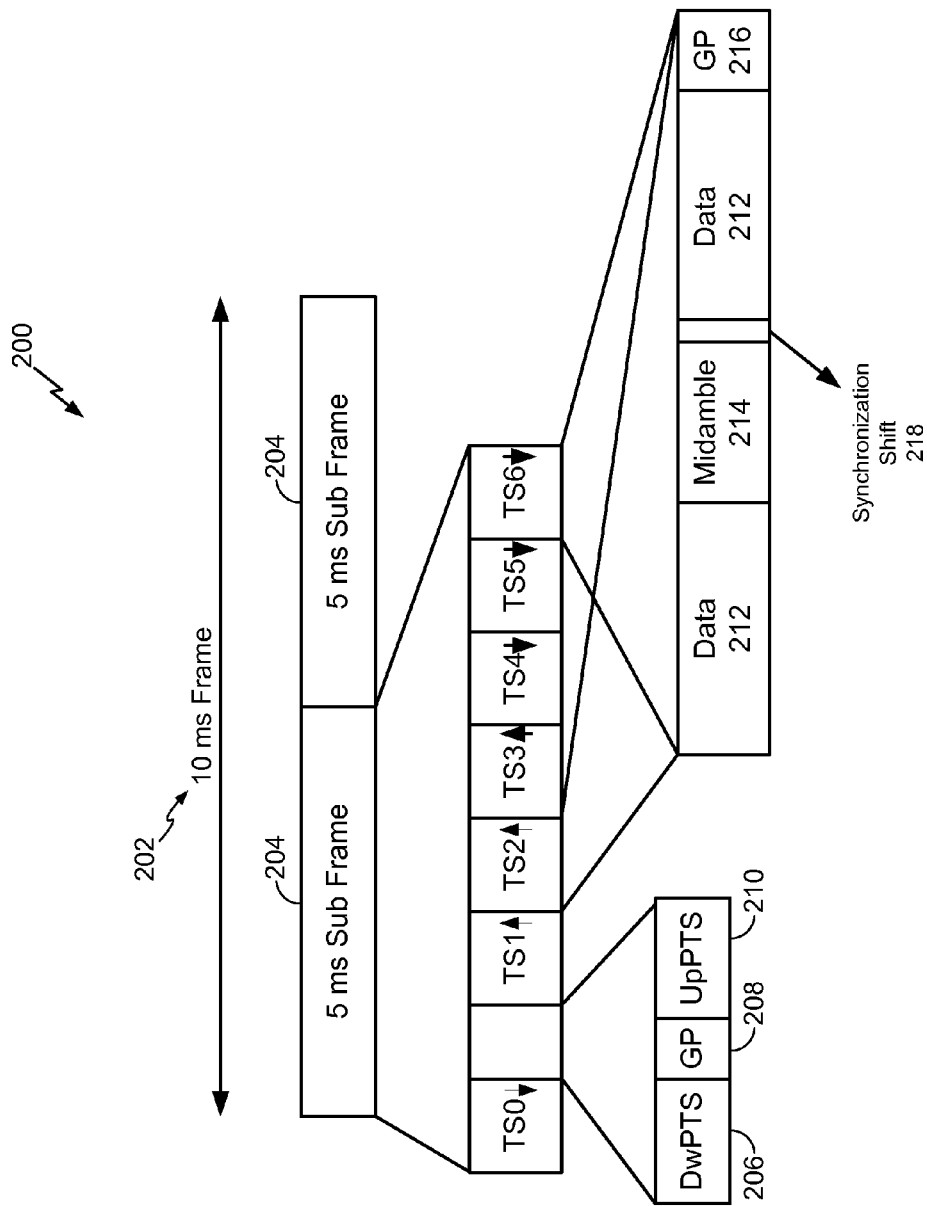
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
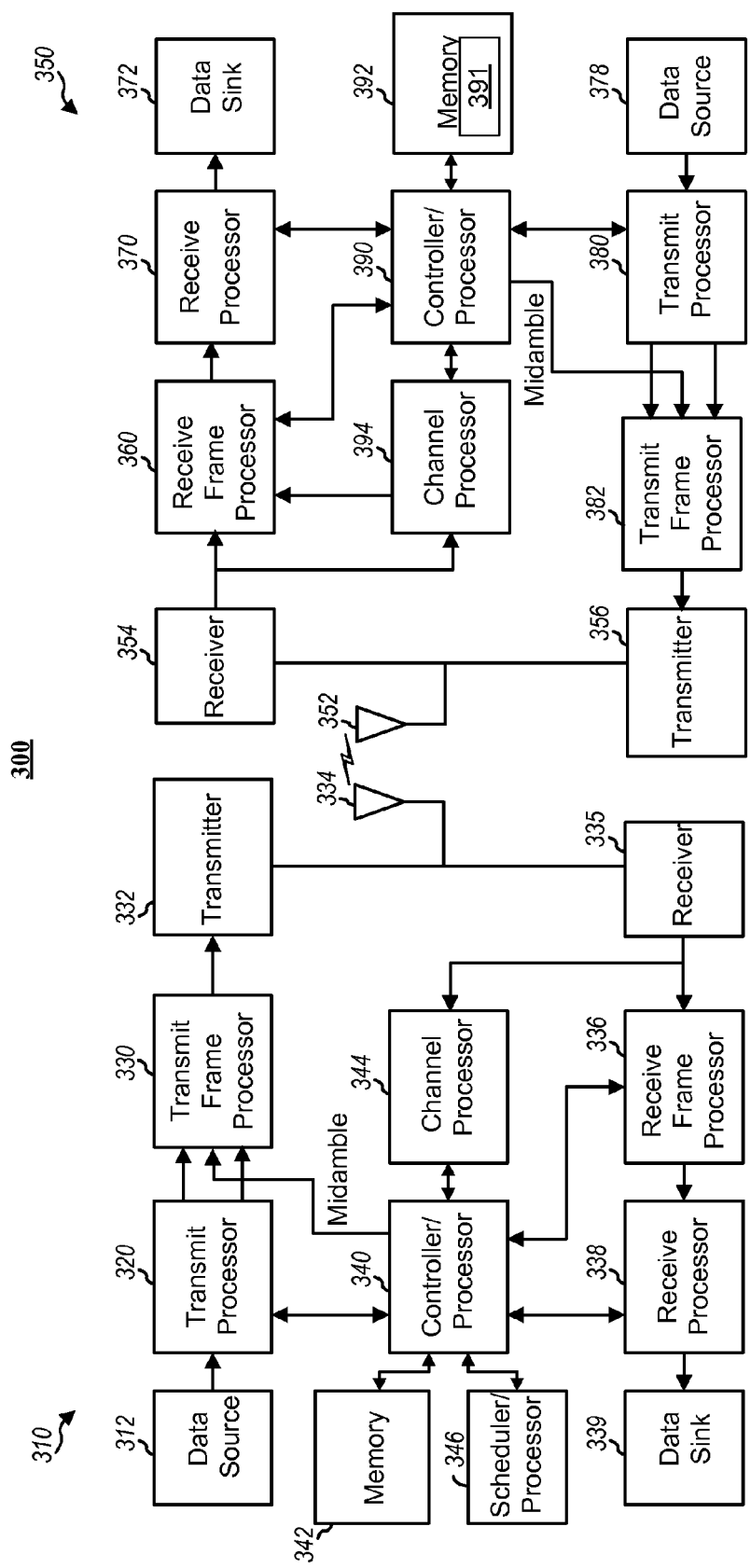
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store a BSIC confirm/reconfirm module 391 which, when executed by the controller/processor 390, configures the UE 350 for inter-RAT/inter-frequency measurements. A scheduler/processor 346 at the node B 310 may be used to allocate resources to the UEs and schedule downlink and/or uplink transmissions for the UEs.

Certain UEs may be capable of communicating on multiple radio access technologies (RATs). Such UEs may be referred to as multimode UEs. For example, a multimode UE may be capable of communications on a Universal Terrestrial Radio Access (UTRA) frequency division duplexed (FDD) network such as a Wideband-Code Division Multiple Access (W-CDMA) network, a UTRA time division duplexed (TDD) network such as a Time Division-Synchronous Code Division Multiple Access (TD-SCDMA) network, a Global System for Mobile Communications (GSM)network and/or a Long Term Evolution (LTE) network.

Figure 4:
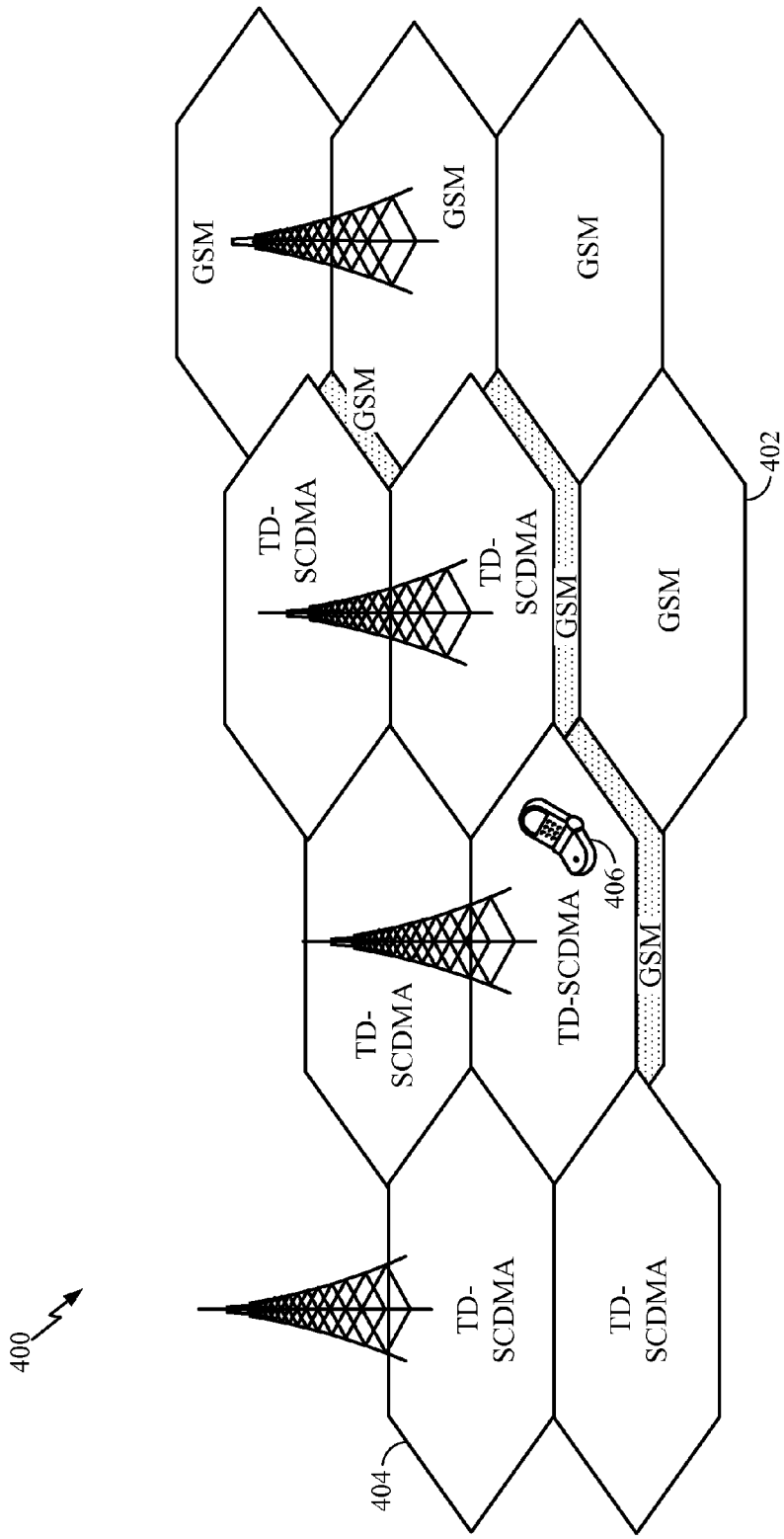
FIG. 4 illustrates network coverage areas according to aspects of the present disclosure.

Some networks, such as a newly deployed network, may cover only a portion of a geographical area. Another network, such as an older more established network, may better cover the area, including remaining portions of the geographical area. FIG. 4 illustrates coverage of a newly deployed network, such as a TD-SCDMA network and also coverage of a more established network, such as a GSM network. A geographical area 400 may include GSM cells 402 and TD-SCDMA cells 404. A user equipment (UE) 406 may move from one cell, such as a TD-SCDMA cell 404, to another cell, such as a GSM cell 402. The movement of the UE 406 may specify a handover or a cell reselection.

The handover or cell reselection may be performed when the UE moves from a coverage area of a TD-SCDMA cell to the coverage area of a GSM cell, or vice versa. A handover or cell reselection may also be performed when there is a coverage hole or lack of coverage in the TD-SCDMA network or when there is traffic balancing between the TD-SCDMA and GSM networks. As part of that handover or cell reselection process, while in a connected mode with a first system (e.g., TD-SCDMA) a UE may be specified to perform a measurement of a neighboring cell (such as GSM cell). For example, the UE may measure the neighbor cells of a second network for signal strength, frequency channel, and base station identity code (BSIC). The UE may then connect to the strongest cell of the second network. Such measurement may be referred to as inter radio access technology (IRAT) measurement.

The UE may send a serving cell a measurement report indicating results of the IRAT measurement performed by the UE. The serving cell may then trigger a handover of the UE to a new cell in the other RAT based on the measurement report. The triggering may be based on a comparison between measurements of the different RATs. The measurement may include a TD-SCDMA serving cell signal strength, such as a received signal code power (RSCP) for a pilot channel (e.g., primary common control physical channel (PCCPCH)). The signal strength is compared to a serving system threshold. The serving system threshold can be indicated to the UE through dedicated radio resource control (RRC) signaling from the network. The measurement may also include a GSM neighbor cell received signal strength indicator (RSSI). The neighbor cell signal strength can be compared with a neighbor system threshold. Before handover or cell reselection, in addition to the measurement processes, the base station IDs (e.g., BSICs) are confirmed and re-confirmed.

When a UE is camped on a TD-SCDMA cell, the UE regularly searches for a better cell from the neighbor cell indicated by a (system information block) SIB11/12 message or a measurement control message (MCM). If a better neighbor cell in the GSM network is found, then IRAT TD-SCDMA to GSM cell reselection is performed. An offset value, Qoffset, is used to calculate neighbor cell rank (Rn), where Rn=GSM RSSI−Qoffset. a hysteresis parameter, Qhyst, is used to calculate the TD-SCDMA serving cell rank (Rs), where Rs=serving cell PCCPCH RSCP+Qhyst (where PCCPCH RSCP is the primary common control physical channel received signal code power). If a GSM cell is ranked as the best cell, and remains so for a predetermined time interval, T reselection, then the UE performs IRAT re-selection to that GSM cell.

When the TD-SCDMA serving cell signal strength (e.g., PCCPCH RSCP) is below a predefined value (Sinter-search+ Qrxlevmin), the UE attempts to verify the BSIC for each of the four strongest GSM broadcast channel (BCCH) carriers and ranks the verified GSM BCCH cells. If the UE detects a BSIC not indicated in the measurement control system information, or the UE cannot demodulate the BSIC of that GSM BCCH carrier, the UE does not consider that GSM BCCH carrier in cell reselection. The UE also does not consider the GSM BCCH carrier in cell reselection, if the UE cannot demodulate the BSIC of that GSM BCCH carrier.

If the inter-RAT GSM cell is ranked better than the serving cell, and the condition lasts for a time duration, Treselection, the UE performs IRAT cell reselection and reselects that GSM cell.

In current the 3GPP/CSSA specification, the UE always performs BSIC confirm and reconfirm for each of the top number (N) strongest GSM broadcast channel (BCCH) carriers regardless of their signal strength (e.g., RSSI) value. When the GSM neighbor cells' signal strengths are much lower than the threshold to trigger IRAT cell reselection, the UE still performs a BSIC confirm and reconfirm procedure, which wastes the UE battery. The number of GSM cells for the BSIC confirm and reconfirm procedure is fixed to reach the maximum number, N, regardless of the signal strength value. If some of the top N strongest GSM BCCH carriers have signal strength values that are too low, the BSIC of that GSM BCCH carrier cannot be demodulated, which also unnecessarily wastes the UE battery.

Aspects of the present disclosure are directed to conserving the UE battery. In particular, the UE is configured to not always perform BSIC confirm and reconfirm procedures for all of the top N GSM neighbor cells. Rather, in one aspect, the UE performs BSIC confirm and reconfirm procedures only for the GSM neighbor cells having signal strength values above a predefined absolute threshold value and also above a predefined relative threshold value (e.g., the TD-SCDMA serving cell PCCPCH RSCP+Qoffset+Qhyst−the predefined margin value). When the GSM neighbor cells signal strength values are not above the threshold value, the UE does not perform a BSIC confirm and reconfirm procedure for those GSM cells within the top N cells to conserve the UE battery. In one configuration, the predefined margin value is different for different services. The different services can be voice only services, data only services, and/or simultaneous voice and data services.

One aspect of the present disclosure is applied to idle mode IRAT cell reselection, but the concepts can be extended to other modes, such as, but not limited to, the UTRAN register area paging channel (URA_PCH) mode, the cell paging channel (CELL_PCH) mode, forward access channel (FACH) mode and dedicated channel (DCH) mode. Dedicated resources are not allocated to the UE in the CELL_PCH and UPA_PCH modes. The UE monitors the paging channel, for CELL_PCH, every time the UE switches to a new cell via cell reselection. The UE sends cell updates to inform the network of its location changes. For UPA_PCH mode, when the UE switches to a cell belonging to the different URA (UTRAN Register Area), the UE sends a URA update to inform the network of its location change. In one example configuration, the idle mode may be denoted when N=4, and FACH mode is denoted when N=6.

One aspect of the disclosure configures the UE so that it does not always perform BSIC confirm and reconfirm for all of the top N GSM neighbor cells, regardless of the signal strength (e.g., RSSI) values of the GSM cells. Rather, the UE only performs BSIC confirm and reconfirm procedures for the GSM neighbor cells having a signal strength above both a predefined absolute threshold and a predefined relative threshold. The UE does not perform a BSIC confirm and reconfirm procedure, when the RSSI value of the GSM neighbor cells is below the threshold value, which effectively reduces UE battery waste. In one configuration, the maximum number of GSM cells to confirm/reconfirm is dependent on a serving cell signal quality and a GSM neighbor cell signal quality.

Figure 5:
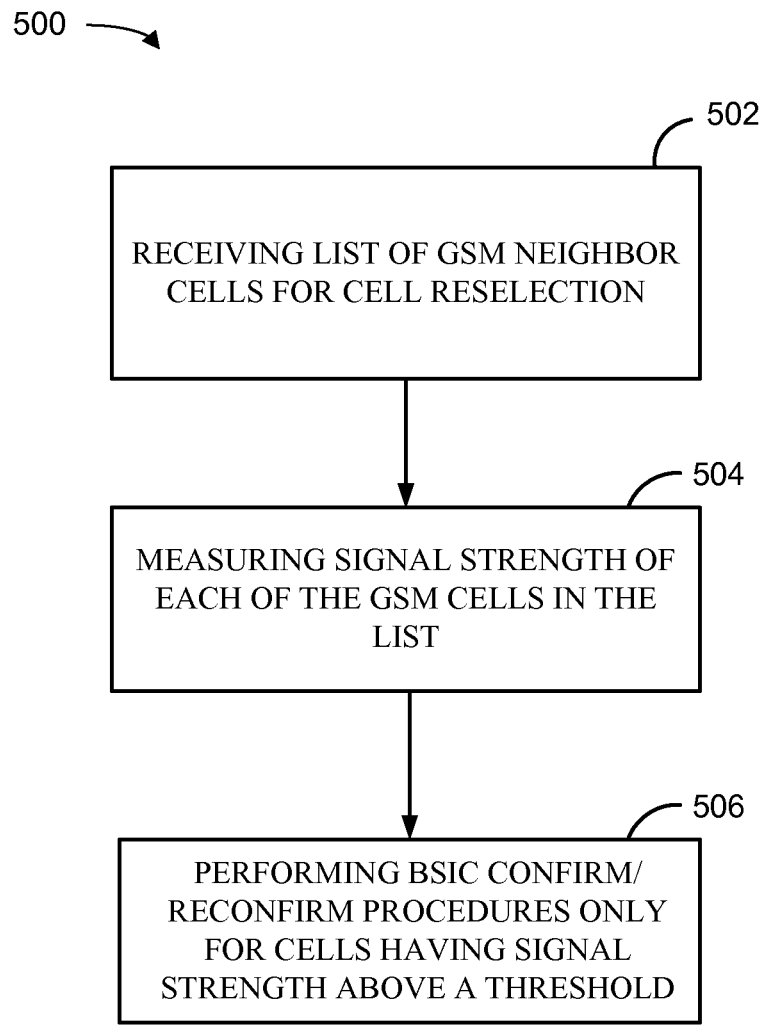
FIG. 5 is a block diagram illustrating a method for performing base station identity code confirm/reconfirm procedures according to an aspect of the present disclosure.

FIG. 5 shows a wireless communication method 500 according to one aspect of the disclosure. A UE 350 receives a list of GSM neighbor cells at block 502. Next, in block 504, the UE measures the signal strength of each of the GSM cells in the received list. The UE performs base station identity code (BSIC) confirm/reconfirm procedures only for cells having a signal strength above a threshold.

Figure 6:
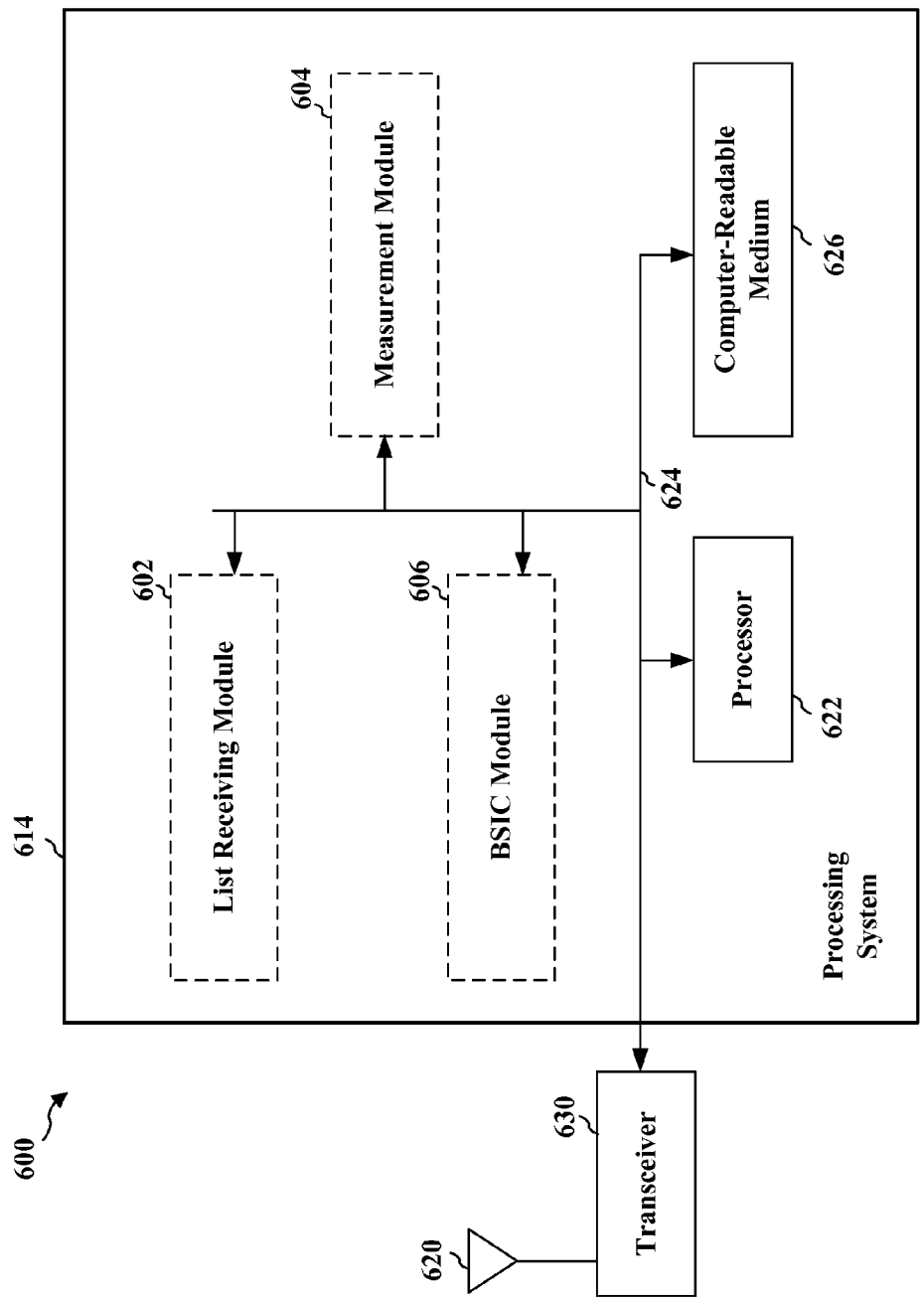
FIG. 6 is a diagram illustrating an example of a hardware implementation for an apparatus employing a processing system according to one aspect of the present disclosure.

FIG. 6 is a diagram illustrating an example of a hardware implementation for an apparatus 600 employing a system 614 that adaptively determines when to perform BSIC confirm/reconfirm procedures. The system 614 may be implemented with a bus architecture, represented generally by the bus 624. The bus 624 may include any number of interconnecting buses and bridges depending on the specific application of the system 614 and the overall design constraints. The bus 624 links together various circuits including one or more processors and/or hardware modules, represented by the processor 622 the modules 602, 604, 606 and the computer-readable medium 626. The bus 624 may also link various other circuits such as timing sources, peripherals, voltage regulators, and power management circuits, which are well known in the art, and therefore, will not be described any further.

The apparatus includes a system 614 coupled to a transceiver 630. The transceiver 630 is coupled to one or more antennas 620. The transceiver 630 enables communicating with various other apparatus over a transmission medium. The system 614 includes a processor 622 coupled to a computer-readable medium 626. The processor 622 is responsible for general processing, including the execution of software stored on the computer-readable medium 626. The software, when executed by the processor 622, causes the system 614 to perform the various functions described for any particular apparatus. The computer-readable medium 626 may also be used for storing data that is manipulated by the processor 622 when executing software.

The system 614 includes a list receiving module 602 for receiving a list of GSM neighbor cells. The system 614 includes a measurement module 604 for measuring signal strengths of each of the GSM cells in the received list. The system 614 also includes a BSIC module 606 for performing BSIC confirm/reconfirm procedures only for cells having signal strength above a threshold. The modules may be software modules running in the processor 622, resident/stored in the computer-readable medium 626, one or more hardware modules coupled to the processor 622, or some combination thereof The system 614 may be a component of the UE 350 and may include the memory 392, and/or the controller/processor 390.

In one configuration, an apparatus such as a UE is configured for wireless communication including means for receiving, means for measuring and means for performing BSIC confirm/reconfirm procedures. In one aspect, the receiving means may be the antennas 352, the receiver 354, the controller/processor 390, and/or the memory 392, configured to perform the functions recited by the receiving means. In one aspect, the measuring means may be the controller/processor 390, and/or the memory 392 configured to perform the functions recited by the measuring means. In one aspect, the performing means the controller/processor 390, and/or the memory 392 configured to perform the functions recited by the communication means. In another aspect, the aforementioned means may be the BSIC confirm/reconfirm module 391, list receiving module 602, measurement module 604, BSIC module 606, the system 614 and/or any module or any apparatus configured to perform the functions recited by the aforementioned means.

Several aspects of a telecommunications system has been presented with reference to TD-SCDMA and GSM systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving, at a user equipment (UE) camped on a serving cell of a first radio access technology (RAT), a list of neighbor cells of a second RAT for inter-radio access technology (IRAT) cell reselection, the first RAT being different from the second RAT;
   measuring signal strength of each neighbor cell in the list; and
   performing base station identity code (BSIC) confirm/reconfirm procedures only for each neighbor cell in the list-having a signal strength-that is greater than a threshold indicated by the serving cell, the threshold being based at least in part on a predetermined margin value for the UE.

2. The method of claim 1, in which the threshold is specific to at least a neighbor cell, a location, or a combination thereof.

3. The method of claim 1, in which the predetermined margin value is different for different services.

4. The method of claim 3, in which the different services comprises voice only services, data only services, or simultaneous voice and data services.

5. The method of claim 1, further comprising, performing the IRAT cell reselection after performing the BSIC confirm/reconfirm procedures.

6. The method of claim 1, in which a maximum number of neighbor cells to confirm/reconfirm is based at least in part on a serving cell signal quality, a neighbor cell signal quality, or a combination thereof.

7. The method of claim 6, in which a signal quality comprises a signal strength.

8. The method of claim 6, in which the cell reselection occurs in an idle mode, a forward access channel (FACH) mode, a cell paging channel (CELL_PCH) mode, or a paging channel (UPA_PCH) mode.

9. An apparatus for wireless communication, comprising:
   means for receiving, at a user equipment (UE) camped on a serving cell of a first radio access technology (RAT), a list of neighbor cells of a second RAT for inter-radio access technology (IRAT) cell reselection, the first RAT being different from the second RAT;
   means for measuring signal strength of each neighbor cell in the list; and
   means for performing base station identity code (BSIC) confirm/reconfirm procedures only for each neighbor cell in the list having a signal strength that is greater than a threshold indicated by the serving cell, the threshold being based at least in part on a predetermined margin value for the UE.

10. A computer program product for wireless communication in a wireless network, comprising:
    a non-transitory computer-readable medium having non-transitory program code recorded thereon, the program code comprising:
       program code to receive, at a user equipment (UE) camped on a serving cell of a first radio access technology (RAT), a list of neighbor cells of a second RAT for inter-radio access technology (IRAT) cell reselection, the first RAT being different from the second RAT;
       program code to measure signal strength of each neighbor cell in the list; and
       program code to perform base station identity code (BSIC) confirm/reconfirm procedures only for each neighbor cell in the list having a signal strength that is greater than a threshold indicated by the serving cell, the threshold being based at least in part on a predetermined margin value for the UE.

11. A user equipment (UE) for wireless communication, comprising:
    a memory; and
    at least one processor coupled to the memory, the at least one processor being configured:
       to receive, while camped on a serving cell of a first radio access technology (RAT), a list of neighbor cells of a second RAT for inter-radio access technology (IRAT) cell reselection, the first RAT being different from the second RAT;
       to measure signal strength of each neighbor cell in the list; and
       to perform base station identity code (BSIC) confirm/reconfirm procedures only for each neighbor cell in the list having a signal strength that is greater than a threshold indicated by the serving cell, the threshold being based at least in part on a predetermined margin value for the UE.

12. The UE of claim 11, in which the threshold is specific to at least a neighbor cell, a location, or a combination thereof.

13. The UE of claim 11, in which the predetermined margin value is different for different services.

14. The UE of claim 13, in which the different services comprises voice only services, data only services, or simultaneous voice and data services.

15. The UE of claim 11, in which the at least one processor is further configured to perform the IRAT cell reselection after performing the BSIC confirm/reconfirm procedures.

16. The UE of claim 11, in which a maximum number of neighbor cells to confirm/reconfirm is based at least in part on a serving cell signal quality, a neighbor cell signal quality, or a combination thereof.

17. The UE of claim 16, in which a signal quality comprises a signal strength.

18. The UE of claim 16, in which the cell reselection occurs in an idle mode, a forward access channel (FACH) mode, a cell paging channel (CELL_PCH) mode, or a paging channel (UPA_PCH) mode.

* * * * *